(12) United States Patent
Conradi et al.

(10) Patent No.: US 6,430,346 B1
(45) Date of Patent: *Aug. 6, 2002

(54) NEGATIVE DISPERSION SINGLE MODE WAVEGUIDE FIBER

(75) Inventors: Jan Conradi, Corning; Shiva Kumar, Painted Post, both of NY (US); Steven S. Rosenblum, Wilmington, NC (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 121 days.

(21) Appl. No.: 09/626,632

(22) Filed: Jul. 27, 2000

Related U.S. Application Data

(60) Provisional application No. 60/152,437, filed on Sep. 3, 1999, provisional application No. 60/152,844, filed on Sep. 8, 1999, provisional application No. 60/156,798, filed on Sep. 30, 1999, provisional application No. 60/174,264, filed on Jan. 3, 2000, and provisional application No. 60/185,253, filed on Feb. 28, 2000.

(51) Int. Cl.[7] .............................. G02B 6/02; G02B 6/00
(52) U.S. Cl. ........................................................ 385/123
(58) Field of Search ................................. 385/123, 147, 385/124, 28, 127; 359/161, 900

(56) References Cited

U.S. PATENT DOCUMENTS

| | | | |
|---|---|---|---|
| 5,115,440 A | 5/1992 | Gysel et al. | 372/38 |
| 5,343,322 A | 8/1994 | Pirio et al. | 359/173 |
| 5,524,144 A | 6/1996 | Suzuki | 359/176 |
| 5,611,016 A | 3/1997 | Fangmann et al. | 385/100 |
| 5,613,028 A | 3/1997 | Antos et al. | 385/123 |
| 5,684,909 A | 11/1997 | Liu | 385/127 |
| 5,721,800 A | 2/1998 | Kato et al. | 385/127 |
| 5,852,701 A | 12/1998 | Kato et al. | 385/127 |
| 5,877,881 A | 3/1999 | Miyauchi et al. | 359/161 |
| 5,887,105 A * | 3/1999 | Bhagavatula et al. | 359/161 |
| 5,894,537 A * | 4/1999 | Berkey et al. | 385/147 |
| 5,999,679 A * | 12/1999 | Antos et al. | 385/127 |
| 6,072,929 A | 6/2000 | Kato et al. | 385/123 |

FOREIGN PATENT DOCUMENTS

| | | |
|---|---|---|
| EP | 0 721 119 | 7/1996 |
| EP | 0 724 171 | 7/1996 |
| EP | 0 774 676 | 5/1997 |
| EP | 1037074 | 9/2000 |
| WO | WO 98/49586 | 11/1998 |

OTHER PUBLICATIONS

Gary Stix, "Builders of Light Pipes", Scientific American: Innovations, Jul., 2001 (4 pages).

C. Lin et al., Optical–Pulse Equalization of Low–Dispersion Transmission in Single–Mode Fibers in the 1.3–1.7—$\mu$m Spectral Region, Optics Letters, Nov. 1980, vol. 5, No. 11, pp. 476–478.

(List continued on next page.)

Primary Examiner—Akm E. Ullah
(74) Attorney, Agent, or Firm—William J. Chervenak

(57) ABSTRACT

Disclosed is a negative total dispersion waveguide fiber having low attenuation and sufficiently good resistance to bend loss that attenuation is not impacted by cabling or otherwise buffering the waveguide. The total dispersion slope of the waveguide fiber is positive so that the zero dispersion wavelength is greater than 1600 nm. The waveguide fiber may advantageously be used in a link having a distributed feedback laser as a signal source. The negative dispersion of the waveguide in accordance with the invention compresses the launched signal pulse when the laser is positively chirped. The laser is operated at optimum bias, which results in positive chirp, but no dispersion penalty is incurred in the link. The waveguide fiber in accordance with the invention may also be advantageously used as a dispersion compensating fiber in a high performance multiplexed telecommunications link.

39 Claims, 14 Drawing Sheets

OTHER PUBLICATIONS

K. Petermann, Laser Diode Modulation and Noise, Kluwer Academic Publishers, Copyright, 1988, pp. 119–144.

Tsuritani et al., Performance Comparison between SCDCF–based System and RDF–based System in Slope–Compensating Transoceanic WDM Transmission, OFC 2000, pp. FC6–1/47–49.

Kurebayashi et al., 10Gb/s, 64 ch, 10,000–km Transmission Capability of a Hybrid–Fiber Transmission Line, OEC, Program No. 11A1–3 (Jul. 11).

D. A. Atlas et al., "Chromatic dispersion limitations due to semiconductor laser chirping in conventional and dispersion–shifted single–mode fiber systems", Optics Letters, Nov. 1998, vol. 13, No. 11, pp. 1035–1037.

K. Hinton et al., "Specifying Adiabatic Lasers for 2.5 Gbit/s, High Dispersion IM/DD Optical Systems", Electronics Letters, Aug. 5, 1993, vol. 29, No. 16, pp. 1479–1480.

G. Ishikawa et al., "10–Gb/s Optical Transmission Systems Using Modulator–Integrated DFB Lasers with Chirp Optimizing", ECOC '96, Oslo, pp. 3.245–3.248.

I. Kim et al., "10–Gb/s Transmission Using 1.3–$\mu$m Low–Chirp High–Power Directly Modulated, Packaged DFB Laser Module for Short Distance (<50km) Applications", IEEE Photonics Technology Letters, vol. 9, No. 8, Aug. 1997, pp. 1167–1169.

C. C. Wang, et al., "Negative Dispersion Fibers for Uncompensated Metropolitan Networks", ECOC, 2000.

* cited by examiner

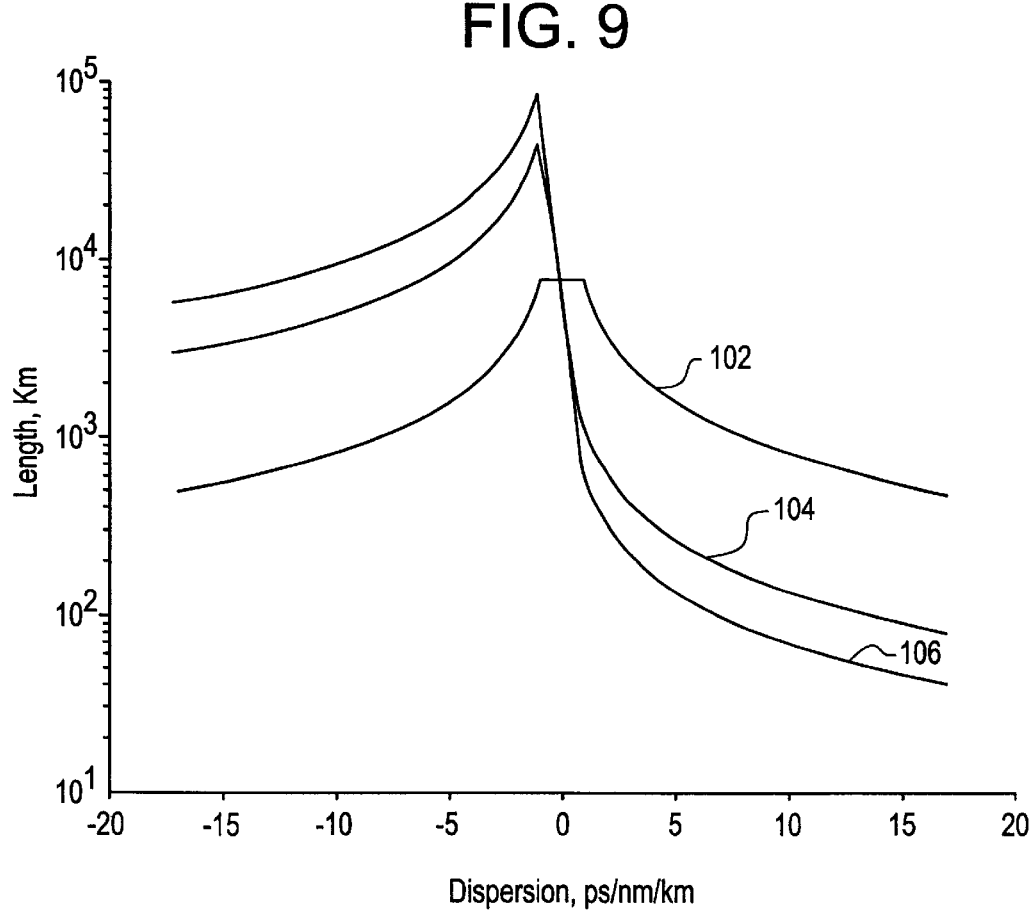

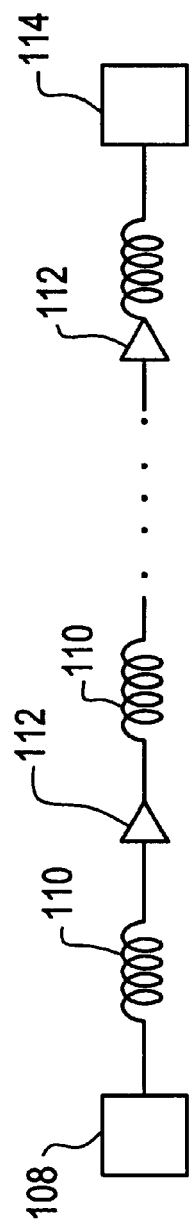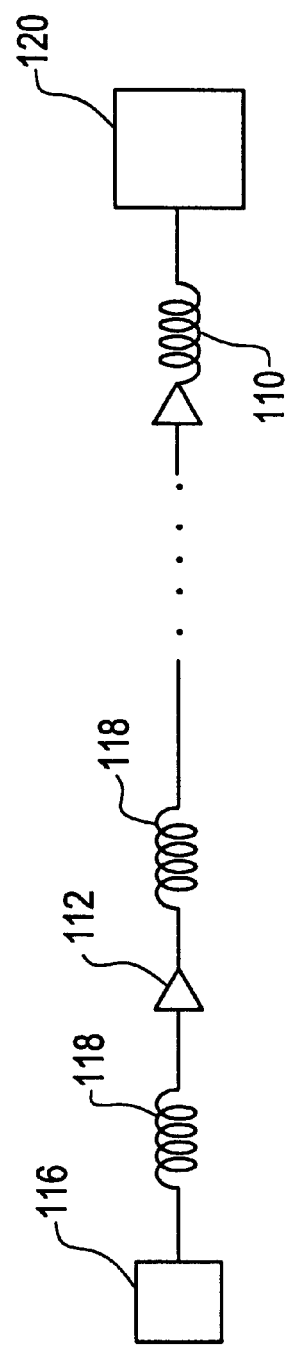

NEGATIVE DISPERSION SINGLE MODE WAVEGUIDE FIBER

CROSS REFERENCE TO RELATED APPLICATIONS

This application claims the benefit of U.S. provisional application No. 60/152,437, filed Sep. 3, 1999, U.S. provisional application No. 60/152,844, filed Sep. 8, 1999, U.S. provisional application No. 60/156,798, filed Sep. 30, 1999, U.S. provisional application No. 60/174,264, filed Jan. 3, 2000 and U.S. provisional application No. 60/185,253, filed Feb. 28, 2000.

BACKGROUND OF THE INVENTION

1. Field of the Invention

The present invention relates generally to a long haul optical waveguide fiber, and particularly to such an optical waveguide fiber that has negative dispersion. The waveguide fiber of the invention can be cabled and used to form all or a portion of an optical telecommunications link.

2. Technical Background

Communications systems operating at bit rates above about a giga-hertz or which include wavelength division multiplexing are facilitated through use of high performance waveguides. In such high performance systems launched power can range from 0.1 mW to 10 mW and higher. In the higher power systems, the desired properties of the waveguide fiber include larger effective area. New system strategies are being sought to decrease cost even while system performance is being enhanced.

A promising strategy is one that involves matching system components in such a way that a particular property of one component compensates a drawback in another component. Preferably, the component matching strategy is one in which a given component is designed to allow another component to operate more efficiently or effectively. Such compensation schemes have been effective, for example, in reducing dispersion penalty by adding a dispersion compensating module to within a communications link, thereby providing for a desired signal to noise ratio or signal pulse shape after the signal pulse has traversed the optical waveguide fiber of the link. Another example of effective compensation is the use of large effective area waveguide fiber in communications systems in which non-linear effects are a major source of signal degradation.

One area which can provide an increase in performance and a decrease in cost is that of matching a signal source to a fiber. A cost effective signal source, having relatively high power output and good longevity is the distributed feedback laser (DFB) which is directly modulated. However a directly modulated DFB laser is always positively chirped. That is, the leading edge of the pulse is shifted to longer wavelengths (red shifted) and the trailing edge is blue shifted. When such a pulse propagates in a positive dispersion fiber, the positive chirp results in pulse broadening. Efforts have been made to reduce the effect of positive chirp by biasing the semiconductor laser above threshold. See *Fiber Optic Communications Systems*, G. P. Agrawal, p. 223.

DEFINITIONS

The following definitions are in accord with common usage in the art.

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

Total dispersion of a waveguide fiber is the sum of the material dispersion, the waveguide dispersion, and the inter-modal dispersion. In the case of single mode waveguide fibers the inter-mode dispersion is zero.

The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

A chirped laser is one that produces an output pulse wherein the wavelengths within the pulse wavelength are shifted backward or forward in time. That is, the output pulse is red or blue shifted. A laser having a positive chirp is one in which the leading edge of the output pulse is red shifted and the trailing edge blue shifted.

The effective area is $$A_{eff} = 2\pi (\int E^2 r dr)^2 / (\int E^4 r dr),$$

where the integration limits are 0 to ∞, and E is the electric field associated with light propagated in the waveguide. An effective diameter, $D_{eff}$, may be defined as, $$A_{eff} = \pi (D_{eff}/2)^2.$$

The relative refractive index percent, $\Delta\% = 100 \times (n_i^2 - n_c^2)/2n_i^2$, where $n_i$ is the maximum refractive index in region i, unless otherwise specified, and $n_c$ is the average refractive index of the cladding region.

The term α-profile refers to a refractive index profile, expressed in terms of Δ (b)%, where b is radius, which follows the equation, $$\Delta(b)\% = \Delta(b_o)(1 - [|b-b_o|/(b_1-b_o)]^\alpha),$$

where $b_o$ is the point at which Δ(b)% is maximum, $b_1$ is the point at which Δ(b)% is zero, and b is in the range $b_i \leq b \leq b_f$, where delta is defined above, $b_i$ is the initial point of the α-profile, $b_f$ is the final point of the α-profile, and a is an exponent which is a real number. The initial and final points of the α-profile are selected and entered into the computer model. As used herein, if an α-profile is preceded by a step index profile or any other profile shape, the beginning point of the α-profile is the intersection of the α-profile and the step or other profile.

In the model, in order to bring about a smooth joining of the α-profile with the profile of the adjacent profile segment, the equation is rewritten as;

$$\Delta(b)\% = \Delta(b_a) + [\Delta(b_o) - \Delta(b_a)]\{(1 - [|b-b_o|/(b_1-b_o)]^\alpha\},$$

where $b_a$ is the first point of an adjacent segment.

The pin array bend test is used to compare relative resistance of waveguide fibers to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins.

Another bend test referenced herein is the lateral load test. In this test a prescribed length of waveguide fiber is placed between two flat plates. A #70 wire mesh is attached to one of the plates. (The market code #70 mesh is descriptive of screen made of wire having a diameter of 0.178 mm. The screen openings are squares of side length 0.185 mm.) A known length of waveguide fiber is sandwiched between the plates and a reference attenuation is measured while the plates are pressed together with a force of 30 newtons. A 70 newton force is then applied to the plates and the increase in attenuation in dB/m is measured. This increase in attenuation is the lateral load attenuation of the waveguide.

Adiabatic chirp is proportional to the output power of the signal.

Transient chirp is proportional to the derivative of the output power of the signal and so is present only in the time periods when the signal power is in transition between a 0 and a 1 (or a 1 to a 0).

Gain compression factor, also known as the nonlinear gain parameter, refers to a semiconductor laser and is a proportionality constant that relates semiconductor laser material optical gain of the active region of the laser to the number of photons in the active region. In the relationship, $G=f(\epsilon P)$, G is the gain of the laser, $\epsilon$ is the gain compression factor, P is number of photons in the active region (which is directly related to the laser output power) and f is a function. See *Fiber Optic Communications Systems* $2^{nd}$ *Edition*, Agrawal, page 113.

SUMMARY OF THE INVENTION

A more effective approach to optimize the performance of a positively chirped laser makes use of waveguide fiber having a negative total dispersion. In this case, the positively chirped pulse propagating in a negative total dispersion fiber undergoes compression and hence a negative dispersion power penalty is obtained. Applicants have discovered that by using the fiber disclosed herein, which has negative dispersion at the desired operating wavelength, together with a positively chirped laser, very long link lengths can be achieved before regeneration is needed. For example, relative to standard single mode fiber, a factor of three increase in fiber transmission distance is achievable using the negative dispersion fiber together with a positively chirped laser in accordance with the invention.

One embodiment of the present invention is an optical waveguide fiber having a core region surrounded by and in contact with a clad layer. The core region has at least two segments. Each of the segments is characterized by respective refractive index profiles, inner and outer radii, and relative index percents, all of which are preferably positive relative to the average value of core refractive index as defined above. The segment refractive index profiles are preferably selected to provide a waveguide fiber having negative total dispersion at 1530 nm and a positive total dispersion slope over a wavelength range of, 1525 nm to 1625 nm, which covers both the C and L wavelength bands. The zero dispersion wavelength is preferably greater than 1560 nm, more preferably greater than 1580 nm, even more preferably greater than 1610 nm, and most preferably greater than 1625 nm. The optical waveguide of the invention can be made to operate over other wavelength ranges by adjusting the refractive index profile of the core region such that for any given operating wavelength range the zero dispersion wavelength is greater than or equal to the longest wavelength of that range. The waveguide is preferably single mode over a selected operating wavelength range, although operation in a wavelength range where the waveguide propagates two or more modes is possible. In some cases, a waveguide that propagates two or more modes is effectively single mode fiber because the higher order modes are strongly attenuated so that these higher modes disappear before reaching the receiver end of a communication system.

The fibers of the present invention have applicability in the 1310 nm operating window (1250 nm to 1370 nm), the 1550 nm operating window (1530 nm–1565 nm), the L-band (1565 nm–1625 nm), and higher wavelengths up to 1700 nm. In other words, the fibers disclosed herein can potentially be utilized at any wavelength between 1250 nm and 1700 nm.

In another embodiment, the present invention is a waveguide fiber telecommunications link, operating over a desired operating wavelength range, including a laser light source, a receiver, optically coupled to each other by at least one waveguide fiber made in accordance with the invention. The laser light source is positively chirped. The at least one waveguide fiber of the link has negative total dispersion at 1550 nm. A positively chirped pulse from the laser will be compressed upon entering the negative dispersion waveguide fiber. That is, the negative dispersion waveguide fiber produces a blue shift in the leading edge of wavelengths within the pulse that offsets the red shift of the wavelengths in the pulse caused by the positive chirp. The negative dispersion fiber also red shifts the trailing edge of wavelengths within the pulse. The result is that the pulse is compressed, thereby providing negative dispersion power penalty. It is to be understood that the waveguide fibers in a link are typically cabled or otherwise buffered.

Laser chirp can be characterized as adiabatic which means the chirp is proportional to the optical output power of the laser. In contrast, transient chirp is proportional to the rate of change of optical output power with time. In the case of the directly modulated DFB lasers, the chirp is predominantly adiabatic when the laser is always operated well above threshold with low extinction ratios (e.g. 6 dB). Furthermore, adiabatic laser chirp is characterized by a relatively high gain compression factor, e.g., one in the range of $4 \times 10^{-23}$ $m^3$ to $30 \times 10^{-23}$ $M^3$.

However with present technology the chirp becomes predominantly transient when the laser is operated closer to threshold, where the extinction ratios becomes much higher (e.g. 12 dB). The exact extinction ratio or drive condition under which a laser's chirp switches from predominantly adiabatic to predominantly transient depends upon the exact parameters of the laser itself. In the case of a transient chirp operation of a DFB laser the gain compression factor in transient operation is no greater than about $1 \times 10^{-23}$ m$^3$. Gain compression factor for a particular laser structure may be measured by using fitting techniques described, for example, in L. A. Coldren and S. W. Corzine, "Diode lasers and photonic integrated circuits", Wiley, 1995, p.211, 'Intensity modulation and chirp of 1.55 um MQW laser diodes: modeling and experimental verification', K. Czotscher et. al., IEEE Journal of Selected Topics in Quantum Electronics, vol. 5, no. 3, May/June 1999, or, 'Extraction of DFB laser rate equation parameters for system simulation purposes', J. C. Cartledge et. al., IEEE Journal of Lightwave Technology, vol.15, no. 5, May 1997.

Recent work indicates that transient chirp dominated laser operation is preferred. The eye diagram remains open over a longer fiber distance in the case of transient operation.

While the preferred operating wavelength of the link is 1530 nm to 1565 nm, a more preferred operating range is 1530 nm to 1625 nm, an even more preferred operating range is 1250 nm to 1625 nm, and a most preferred operating range is 1250 nm to 1700 nm.

The telecommunications link of the invention can include only waveguides having negative dispersion or can include waveguide having positive dispersion. The link can include both positive and negative dispersion waveguides. The positive and negative dispersions of the waveguides forming a link of this type are preferably selected so that the positive dispersion of the positive dispersion waveguides substantially cancels the residual negative dispersion of the negative dispersion waveguides. The residual negative dispersion of the negative dispersion waveguides is the portion of the negative dispersion that is not effectively canceled by the positive chirp of the light source. The waveguides making up the link can be selected to provide an end to end link dispersion that is positive, negative, or zero. In one embodiment the magnitude of the end to end dispersion of the link is less than 10 ps/nm and preferably less than 5 ps/nm at 1550 nm. Of particular value is a link in which end to end dispersion is very small, to provide minimal signal distortion, while the respective dispersions of the waveguides forming the link are not too close to zero (not less than about 0.05 ps/nm-km) so that dispersion penalty due to non-linear four wave mixing is avoided.

The waveguide fiber forming the link generally is cabled or otherwise protected.

Yet another aspect of the invention is a dispersion compensated communications link in which the dispersion compensating waveguide fiber is a negative dispersion waveguide in accordance with the first aspect of the invention set forth above. The compensating waveguide fiber has attenuation at an operating wavelength less than about 0.5 dB/km, preferably less than 0.25 dB/km, and more preferably less than 0.22 dB/km attenuation at a selected wavelength. For example, attenuation at 1550 nm is preferably less than 0.25 dB/km, and more preferably less than 0.22 dB/km. The compensating waveguide fiber is at least comparable to standard step index single mode fiber in resistance to bending loss so that the compensating fiber can be cabled or otherwise protected and comprises a portion of the link length. The relatively lower effective area of the negative dispersion waveguide compensating fiber can be reduced as a source of non-linear power dispersion in a communications link by placing the negative dispersion fiber away from the signal transmitter. This link configuration ensures the signal will be lower in amplitude when traveling in the lower effective area compensating waveguide, thereby minimizing non-linear dispersion effects.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 8–9 illustrate dispersion limited link length versus waveguide fiber dispersion for links having positive or negative total dispersion.

FIG. 10a is a schematic illustration of a communications link having a transmitter and a receiver linked by negative total dispersion optical waveguide fiber.

FIG. 10b is a schematic illustration of a communications link having a transmitter and a receiver linked by both positive and negative total dispersion optical waveguide fiber.

DETAILED DESCRIPTION OF THE INVENTION

Reference will now be made in detail to the present preferred embodiments of the invention, examples of which are illustrated in the accompanying drawings. In a preferred embodiment of the optical waveguide refractive index profiles of the invention, the wavelength range of operation is 1250 nm to 1700 nm. This range includes the C-band, about 1530 nm to 1565 nm, and the L-band, about 1565 nm to 1625 nm. The waveguide fiber of the present invention exhibits an attenuation at 1550 nm less than or equal to 0.25 dB/km and preferably less than or equal 0.22 dB/km. In addition the index profiles can be adjusted to provide a desired set of dispersion characteristics. In the embodiments shown in FIGS. 1–7, the total dispersion (defined as the sum of waveguide dispersion and material dispersion) is made to be more negative than or equal to −0.1 ps/nm-km at 1600 nm and at 1550 nm is in the range of about −3.2 ps/nm-km to −3.8 ps/nm-km. The slope of the total dispersion is preferably designed so that total dispersion at 1530 nm is less negative than or equal to −15 ps/nm-km. Typically the slope over the wavelength range 1525 nm to 1650 nm is less than or equal to 0.09 ps/nm²km, and more preferably in the range of 0.05 ps/nm²-km to 0.07 ps/nm²-km. A desired range of negative total dispersion values is realized over a wide wavelength range. Effective area at 1550 nm is in the range 35 µm² to 55 µm², more preferably 40 µm² to 50 µm², cabled cutoff wavelength is preferably in the range 1250 nm to 1350 nm, mode field diameter is in the range of about 7.0 µm to 8.5 µnm, pin array bend loss is less than about 12 dB, and attenuation at 1550 nm is less than about 0.22 dB/km, and more preferably less than or equal to about 0.21 dB/km.

Figure 1:
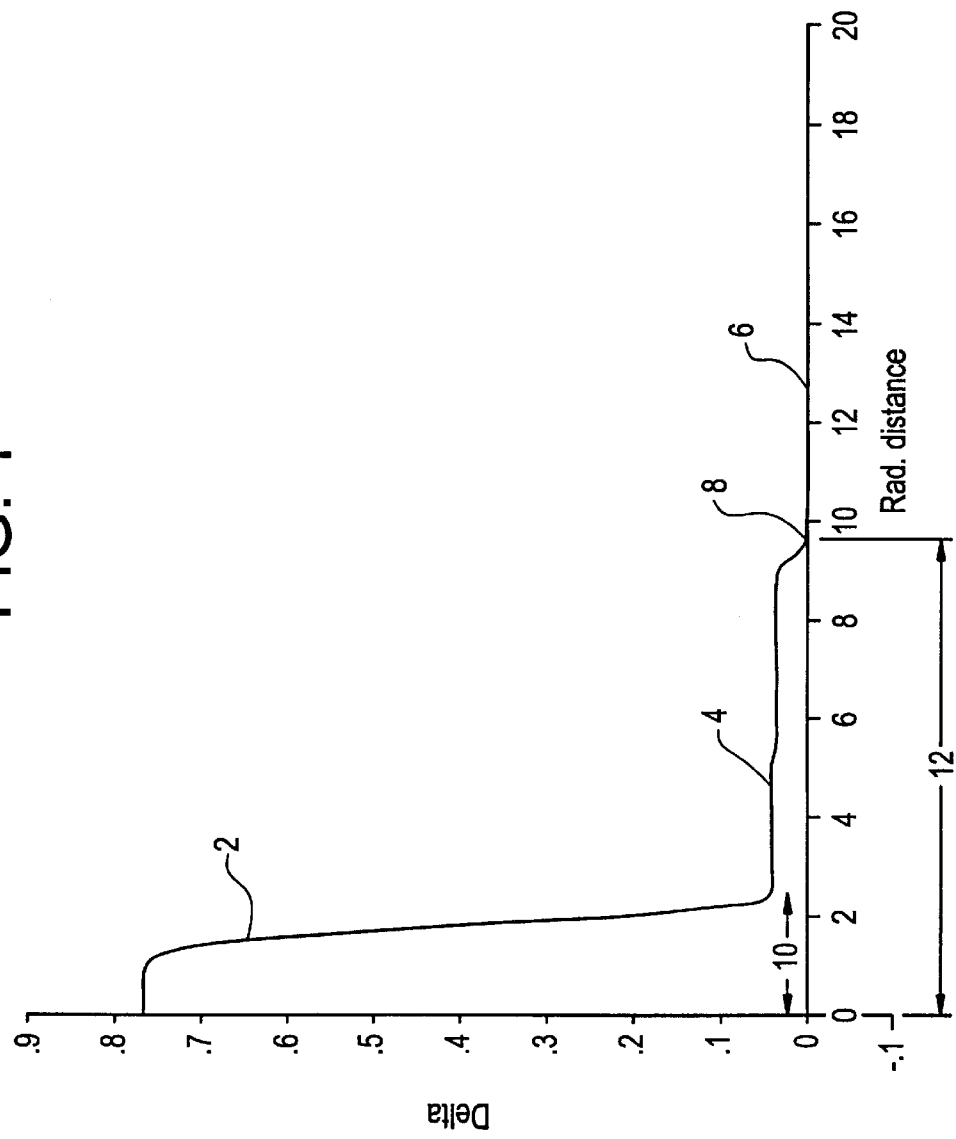
FIGS. 1–7 illustrate embodiments of refractive index profiles in accord with the invention.

An exemplary embodiment of the waveguide fiber refractive index profile of the present invention is shown in FIG. 1 and includes a segmented core region having central segment 2 and annular segment 4. The surrounding clad layer 6 begins at point 8 where the relative index percent of segment 4 is zero. The clad layer 6 has a constant value in this embodiment and a refractive index that is the reference for the calculation of relative index. Preferably, the clad layer 6 consists of pure, undoped silica. Outer radius of segment 2 in this case is determined by extrapolating the straight line portion of segment 2 to where it intersects the Δ%=0 line. The central segment 2 has a relative index in the range of about 0.75% to 0.85% and an outer radius 10 in the range of 2 µm to 3 µm. Annular segment 4 has relative index in the range 0.01% to 0.05% and an outer radius 12 in the range 9 µm to 10 µm. The segments 2 and 4 have respective shapes selected from the group consisting of a rounded step, a step, a trapezoid and an α-profile. Core segment 2 of FIG. 1 is shown as a rounded step shape. An alternative shape for segment 2 is that of an α-profile having an a in the range of 9 to 11. An advantage of this embodiment is its simplicity and ease of manufacture.

Figure 2:
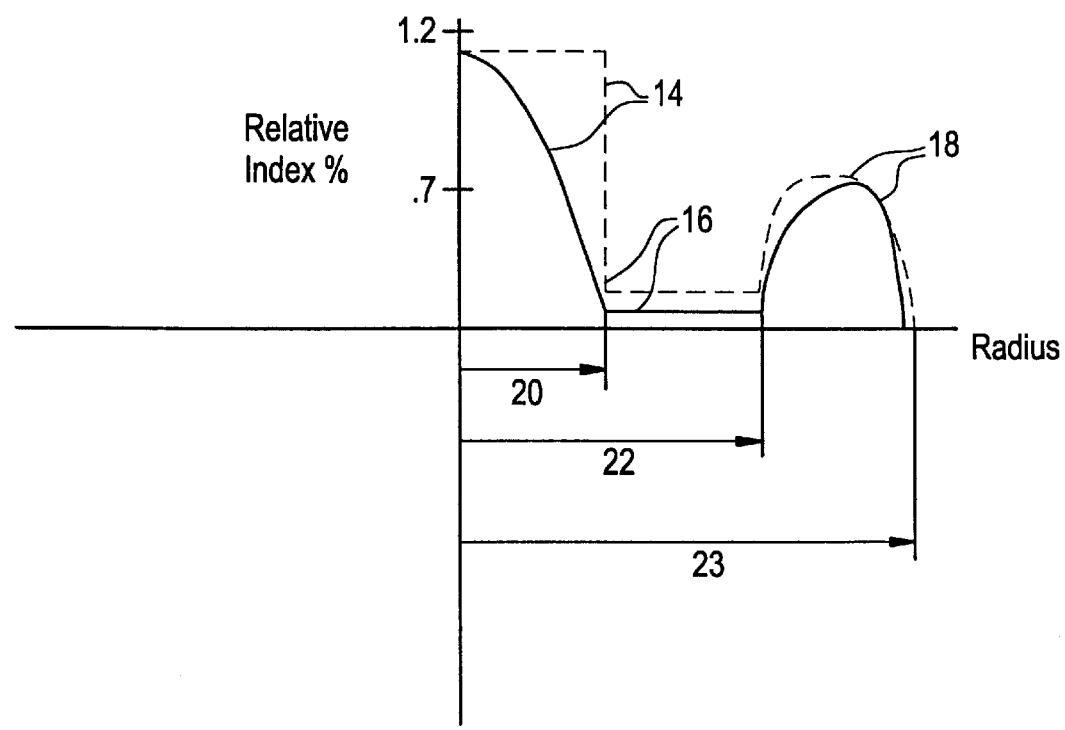

The embodiment illustrated in FIG. 2 features a core region having central segment 14, first annular segment 16, and second annular segment 18. Central segment 14 has a relative index in the range 0.65% to 1.2% and an outer radius 20 in the range of 2 µm to 3.5 µm. It is understood that the inner radius of segment 14 is zero. Annular segment 16 has a relative index in the range 0 to 0.08% and an outer radius 22 in the range 5 µm to 9 µm. The inner radius of annular segment 16 will be understood to be the outer radius of adjacent central segment 14. Annular segment 18 has a relative index in the range 0.1% to 0.25% and an outer radius 23 in the range 5.5 µm to 11 µm. The segment designations 14, 16, and 18 serve to label a solid curve as well as a dashed curve. The dashed curve portions in FIG. 2 illustrate that the segments may take on alternative shapes as mentioned in the discussion of FIG. 1 above. In particular, segments 14 and 18 may have a shape selected from the group consisting of a rounded step, a step, a trapezoid and an α-profile. Segment 16 may be trapezoidal or slightly concave or convex. Thus, what is illustrated in FIGs.1 and 2 and in the additional refractive index profiles discussed below, is that, given the relative index percents and the radii ranges, variation in profile shape is acceptable in the sense that the waveguide fiber properties remain within desired ranges although the respective shapes of the segments vary somewhat. The particular profile shape selected can depend upon such factors as ease of manufacture, shape reproducibility from fiber to fiber, and overall cost.

Figure 3:
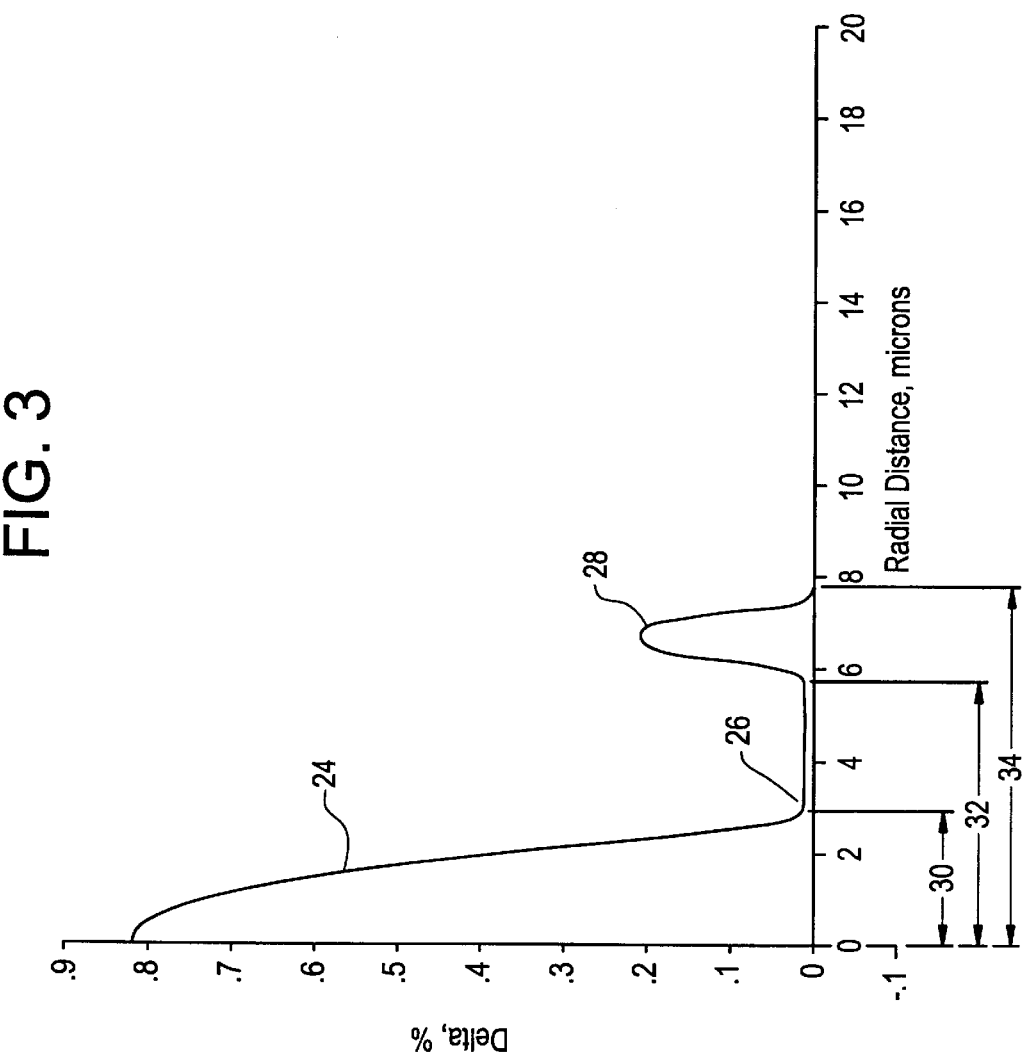

In the embodiment shown in FIG. 3, central segment 24 is an α-profile, a being in the range of 2.0 to 2.5, having a relative index in the range 0.70% to 0.85% and preferably in the range 0.75% to 0.85%. Annular segment 28 can be an α-profile, a being in the range 1 to 2.5, having a relative index in the range 0.15% to 0.30%. In an alternative embodiment segment 24 is an α-profile having an a in the range 2.0 to 2.5 and a relative index percent in the range of 0.70% to 0.85%, preferably in the range 0.75% to 0.85%, and segment 28 is a rounded step having a relative index percent in the range 0.15% to 0.22%. Respective radii 30, 32, and 34 are in the ranges 2 µm to 3.5 µm, 5 µm to 9 µm, and 5.5 µm to 11 µm. In each of these embodiments of FIG. 3, discussed immediately above, the relative index percent of segment 26 is in the range 0 to 0.08%.

Figure 4:
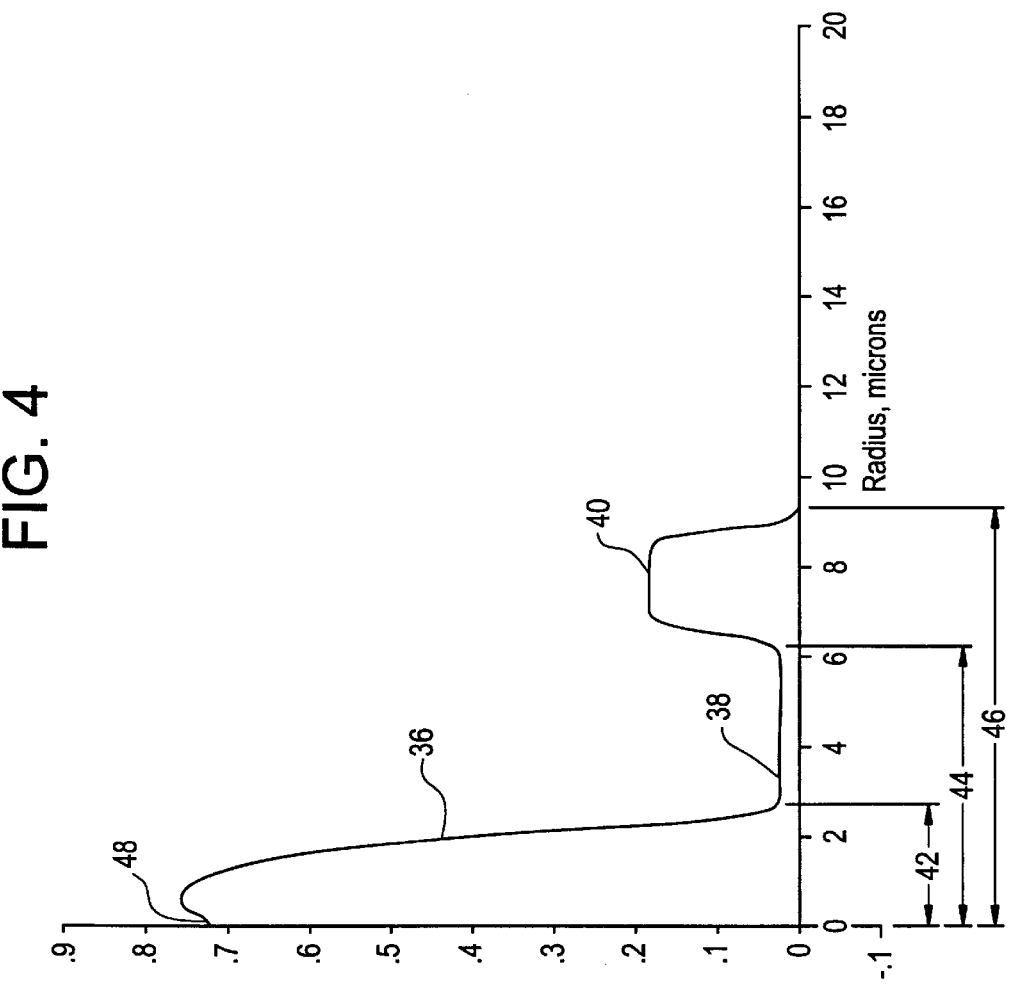

A further embodiment of the refractive index profile of the invention is shown in FIG. 4. Central segment 36 is an α-profile having an a in the range 2.0 to 2.5, a relative index in the range 0.72% to 0.78%, and outer radius 42 in the range of 2 µm to 3.5 µm. Segment 40 is a rounded step index having a relative index percent in the range 0.15% to 0.19%, inner radius 44 in the range 5.6 µm to 6.2 µm and outer radius 46 in the range of 9 µm to 10 µm. Segment 38 has relative refractive index percent in the range 0 to 0.08%. Segment 36 has an index dip 48 on the centerline such that segment 36 has a centerline relative index in the range 0.70% to 0.76%.

Each of the embodiments illustrated in FIGS. 1–4 exhibit functional properties in accord with those set forth above in the summary of the invention and listed below in the examples.

EXAMPLE 1

Figure 5:
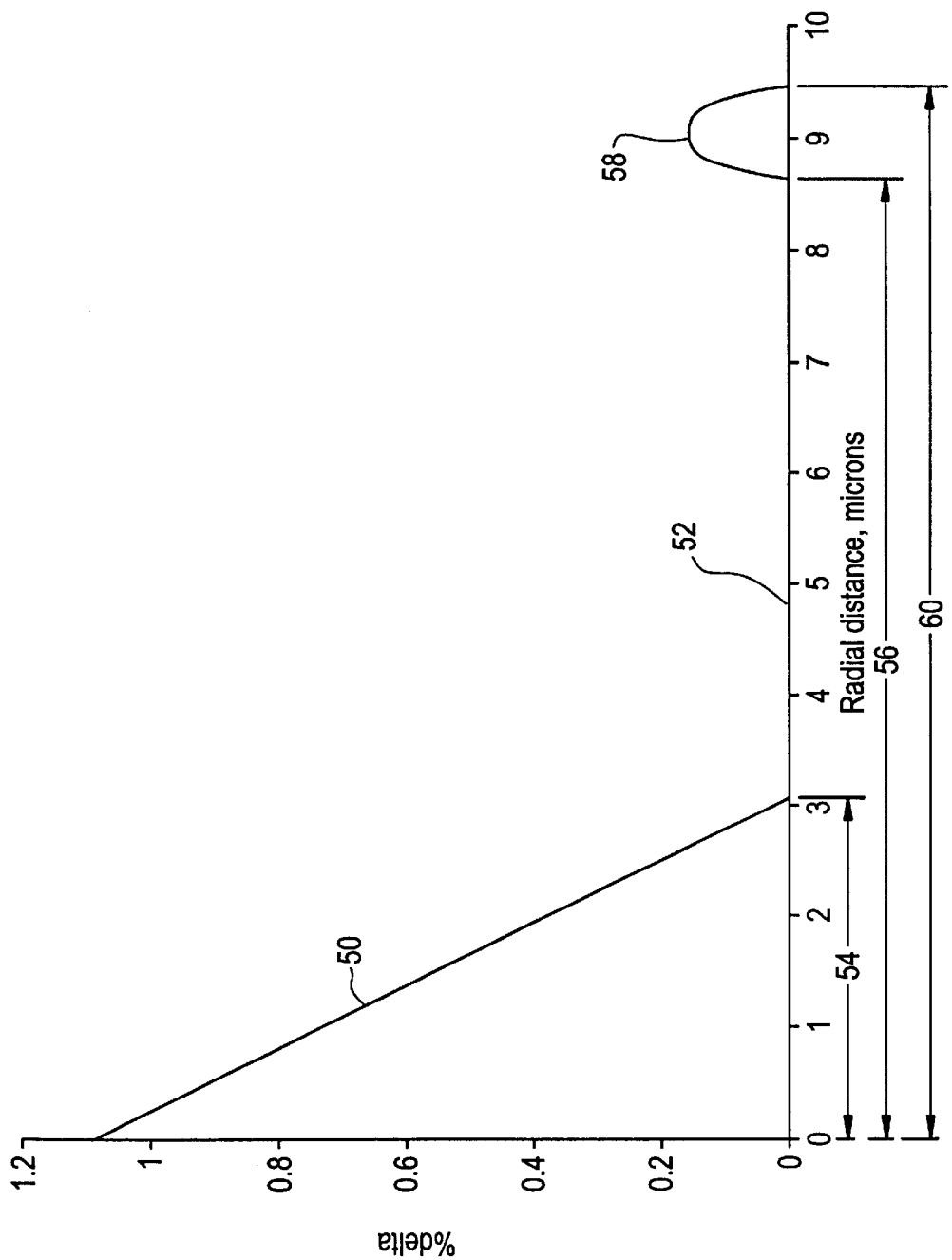

In the embodiment of the invention shown in FIG. 5, segment 50 is an α-profile having an a in the range of 0.9 to 1.1, a relative index percent in the range 1 to 1.2, and, outer radius 54 in the range 2.8 µm to 3.2 µm. Annular segment 52 is a step having a relative index percent of 0 and an outer radius 56 in the range 8.5 µm to 8.9 µm. Annular segment 58 is a rounded step having a relative index in the range 0.15% to 0.20% and an outer radius 60 in the range of 9.3 µm to 9.7 µm.

The modeled properties of a waveguide in accordance with FIG. 5 are:

total dispersion at 1550 nm is −3.39 ps/nm-km;

total dispersion slope over a wavelength range 1525 to 1650 is 0.06 ps/nm km;

zero dispersion wavelength is 1620 nm;

effective area is 42 µm fiber cut off wavelength is 1270 nm;;

mode field diameter is 7.56 µm;

pin array bend loss is 6.94 dB; and, attenuation at 1550 nm is 0.206 dB/km. These properties are within the desired ranges of the waveguide fiber of the invention.

EXAMPLE 2

Figure 6:
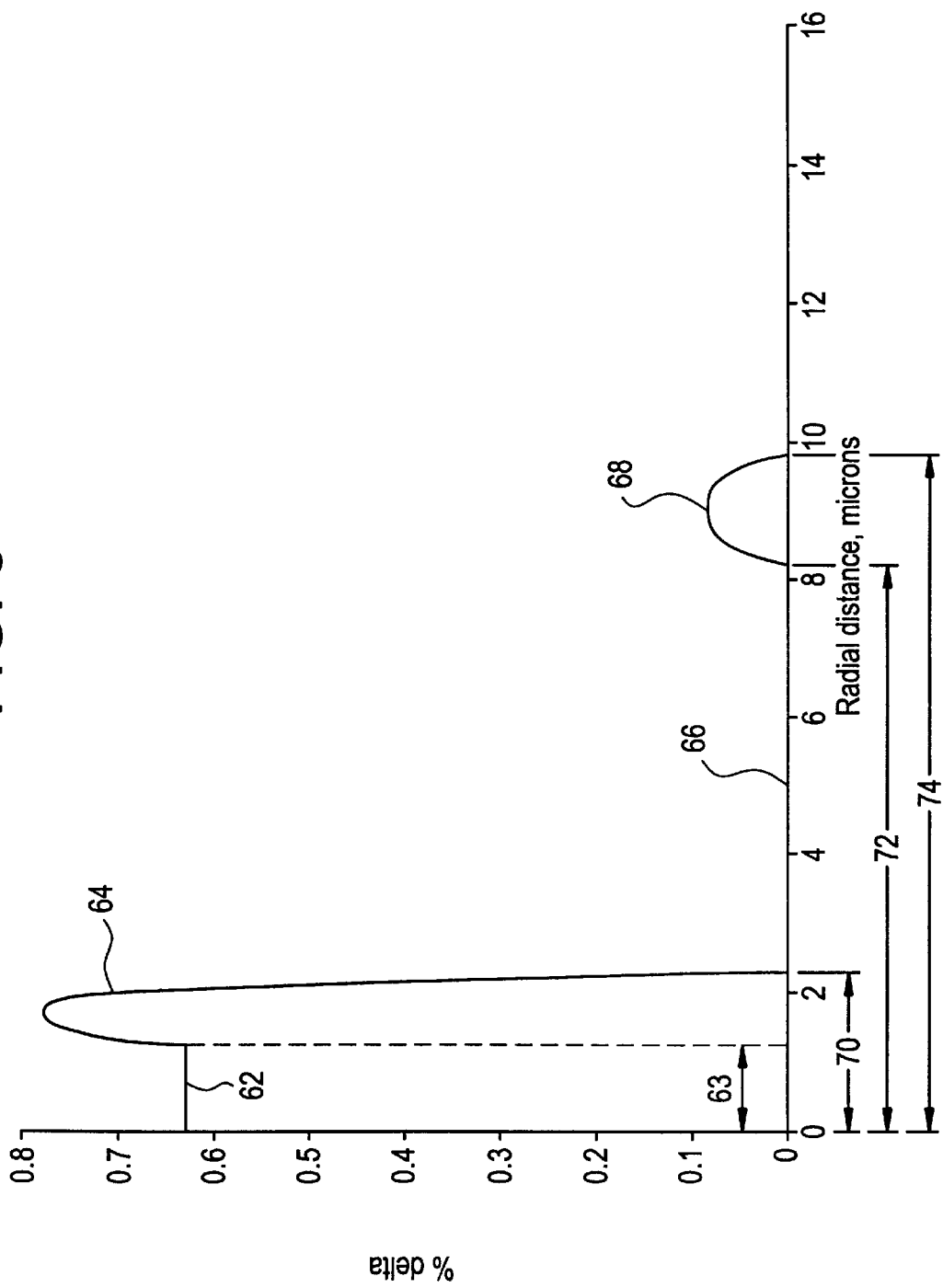

In the embodiment of the invention shown in FIG. 6, central portion 62 is a step profile having a relative index percent in the range 0.60% to 0.65%, and outer radius 63 in the range 0.95 µm to 1.40 µm. Central portion 64 is a rounded step profile having a relative index in the range 0.76% to 0.80% and outer radius 70 in the range 2 µm to 2.5 µm. Annular segment 66 is a step having a relative index percent of 0 and outer radius 72 in the range 8.0 µm to 8.4 µm. Annular segment 68 is a rounded step having a relative index in the range 0.05% to 0.10% and an outer radius 74 in the range of 9.6 µm to 10.0 µm.

The modeled properties of a waveguide in accordance with FIG. 6 are:

total dispersion at 1550 nm is −3.66 ps/nm-km;

total dispersion slope over a wavelength range 1525 to 1650 is 0.053 ps/nm²-km;

zero dispersion wavelength is 1620 nm;

effective area is 44.45 μm²;

fiber cut off wavelength is 1267 nm;;

mode field diameter is 7.71μm;

pin array bend loss is 12 dB; and, attenuation at 1550 nm is 0.21 dB/km.

EXAMPLE 3

Figure 7:
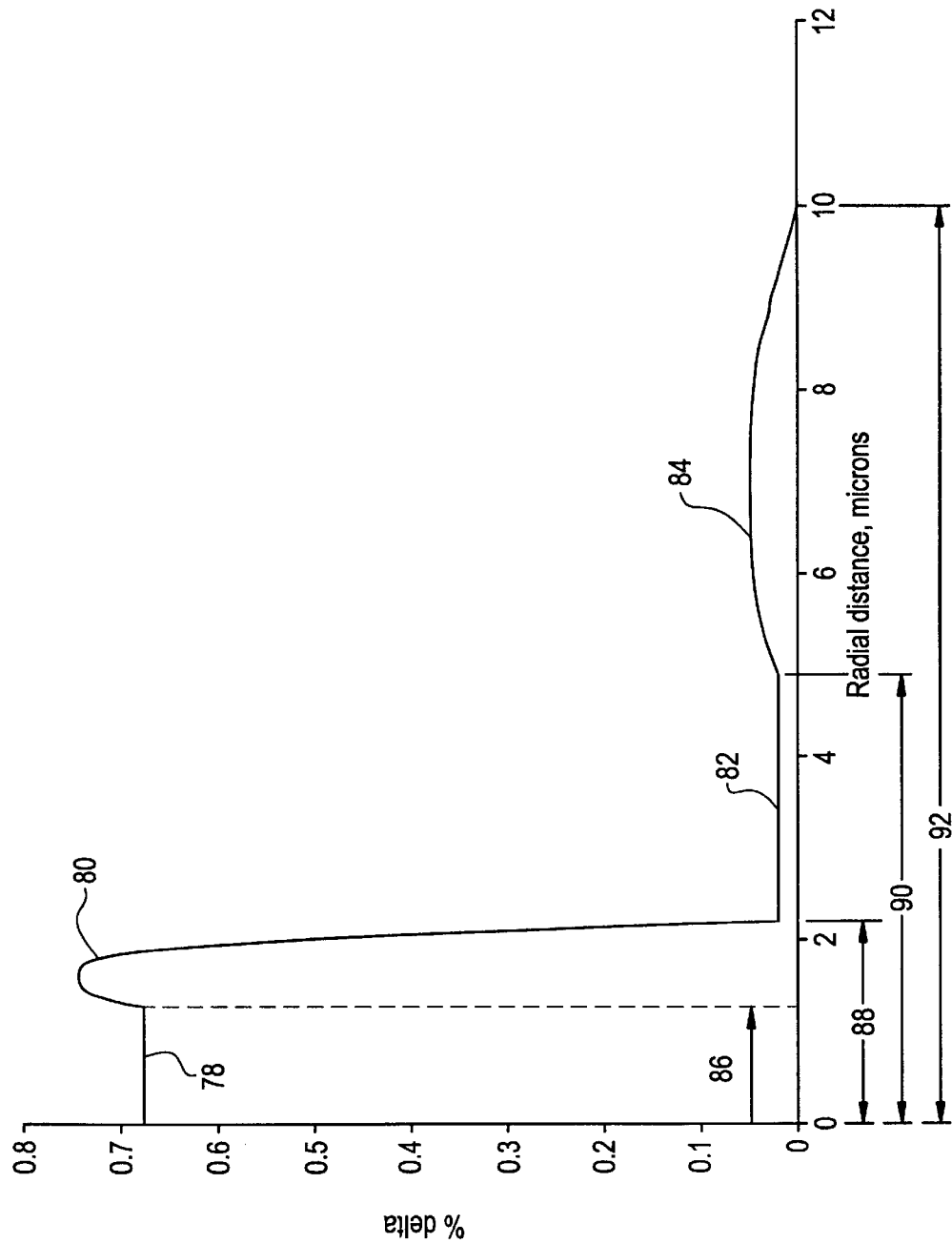

In the embodiment of the invention shown in FIG. 7, central portion 78 is a step profile having a relative index percent in the range 0.65% to 0.70%, and outer radius 86 in the range 0.95 μm to 1.40 μm. Central portion 80 is a rounded step profile having a relative index in the range 0.73% to 0.78% and outer radius 88 in the range 2 μm to 2.5 μm. Annular segment 82 is a step having a relative index percent of 0.01% to 0.03% and outer radius 90 in the range 4.5 μm to 5.5 μm. Annular segment 84 is a rounded step having a relative index in the range 0.04% to 0.08% and an outer radius 92 in the range of 9.6 μm to 10.0 μm.

The modeled properties of a waveguide in accordance with FIG. 7 are:

total dispersion at 1550 nm is −3.66 ps/nm-km;

total dispersion slope over a wavelength range 1525 to 1650 is 0.067 ps/nm²-km;

zero dispersion wavelength is 1620 nm;

effective area is 47.5 μm²;

fiber cut off wavelength is 1270 nm;;

mode field diameter is 7.98 μm;

pin array bend loss is 12 dB; and, attenuation at 1550 nm is 0.21 dB/km.

EXAMPLE 4

Figure 14:
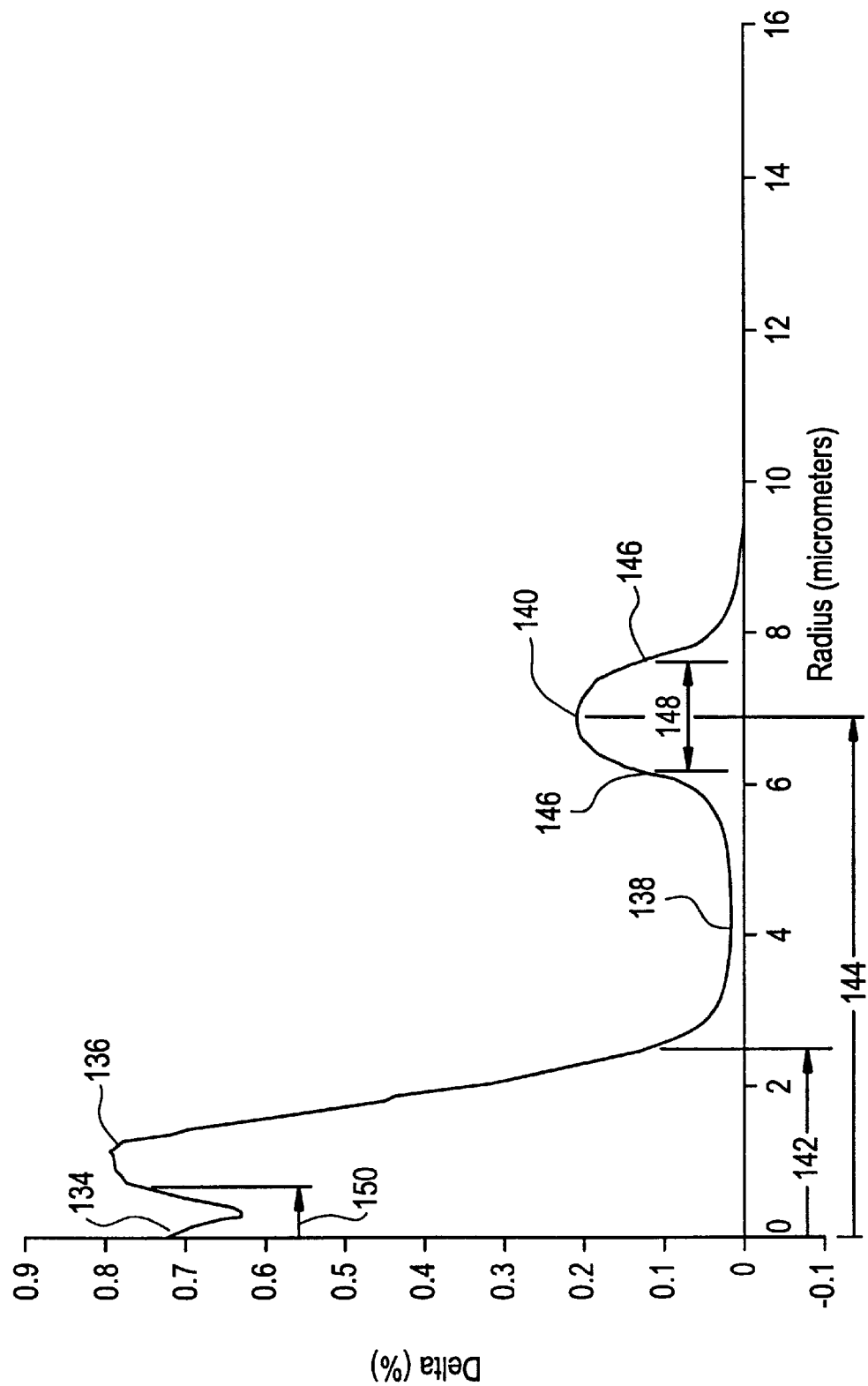
FIG. 14 illustrates relative refractive index versus radius that illustrates an embodiment of a refractive index profile in accord with the invention.

In the embodiment of the invention shown in FIG. 14, segment 136 is an α-profile having an a in the range of 0.70 to 1.50, a relative index percent in the range 0.40% to 0.90%, and, outer radius 142 in the range 2.0 μm to 3.0 μm. In the chart of FIG. 14, the outer radius of the first segment is defined as the intersection of the extrapolated descending portion of the α-profile with the horizontal axis. The zero relative index of this embodiment is chosen to be the relative index of the clad, which in this case is preferably pure silica. Thus the clad layer is effectively the horizontal axis in FIG. 14. The geometry of the remainder of the refractive index profile is expressed in terms of the center radius 144 of the second annular segment and the width 148 of the second annular segment. The width of the second annular segment is taken between the half amplitude points 146 of the segment, where amplitude is measured relative to the horizontal axis. The center of the second annular segment is the center of the line joining the half amplitude points 146. Annular segment 138 is a step index region having a relative index percent in the range 0 to 0.04%. Annular segment 140 is a rounded step index region having a relative index in the range 0.17% to 0.30%, a center radius 144 in the range of 5.5 μm to 8.5 μm, and a width 148 in the range 1.0 μm to 2.5 μm. FIG. 14 includes an optional depressed centerline index profile portion 134. The relative refractive index on the centerline is in the range of 0.4% to 0.9% and the radius of the depression is less than or equal to 1.6 μm. As an alternative, profile portion 134 can be a continuation of the α-profile to the centerline of the waveguide fiber or a flattend index profile portion extending between the end of the α-profile portion and the waveguide fiber center line. The radius 150 is measured from the centerline to the point at which the profile begins to follow the equation of an α-profile and is in the range of 0 to 2 μm. Because of its location and small radius, the depressed centerline index portion has only a limited impact on the power distribution of light propagated in the fiber. It is included in the model calculations because in a typical manufacturing process a centerline level portion or a depression occurs due to diffusion of dopant out of the preform in certain of the process steps.

The modeled properties of a waveguide having a refractive index profile within the relative index versus radius ranges set forth above are:

total dispersion at 1530 nm in the range of −12 ps/nm-km to −5.4 ps/nm-km;

total dispersion slope over a wavelength range 1525 to 1650 is in the range 0.05 ps/nm²-km to 1.0 ps/nm²-km;

zero dispersion wavelength is in the range of 1605 nm to 1737 nm;

effective area is in the range 39 μm² to 56 μm²;

fiber cut off wavelength is in the range 757 nm to 1360 nm;

mode field diameter is 7.30 μm to 8.6 μm;

pin array bend loss is less than or equal to 25 dB; and, attenuation at 1550 nm is in the range 0.201 dB/km to 0.217 dB/km. These properties are within the desired ranges of the waveguide fiber of the invention.

EXAMPLE 5

Manufacturing Results

About 160 km of waveguide fiber was manufactured in accord with the refractive index profile of FIG. 14. The refractive index profile was targeted to have segment 136 as an α-profile with a of 0.9, a relative index percent 0.79%, and outer radius 142 of 2.7 μm. Annular segment 138 had a step index profile of relative index percent 0.015%. Annular segment 140 was a rounded step having a relative index in the range 0.187%, a center radius 144 of 6.8 μm, and a width 148 of 1.4 μm. The depressed centerline segment 134 had relative refractive index on the centerline of 0.8%, and radius of 1.15 μm.

The measured (except effective area) optical properties were, stated in terms of an average value:

total dispersion at 1530 nm of −8.63 ps/nm-km;

total dispersion slope at 1550 nm of 0.08 ps/nm²-km;

zero dispersion wavelength of 1635 nm;

effective area of 48 μm²;

fiber cut off wavelength of 1043 nm to 1360 nm;

mode field diameter at 1550 nm of 8.18 μm;

pin array bend loss of 13 dB/m;

lateral load bend loss of 0.446 dB/m, attenuation at 1550 nm of 0.206 dB/km, and, attenuation at 1625 nm of to 0.220 dB/km.

The consistency of the properties from fiber to fiber was good, showing a favorable process reproducibility.

The waveguide fiber of the invention is seen to have properties suitable for use in a high performance waveguide communication link. The attenuation of the waveguide at 1550 nm is indicative of the attenuation over the preferred operating range 1525 nm to 1650.

Figure 8:
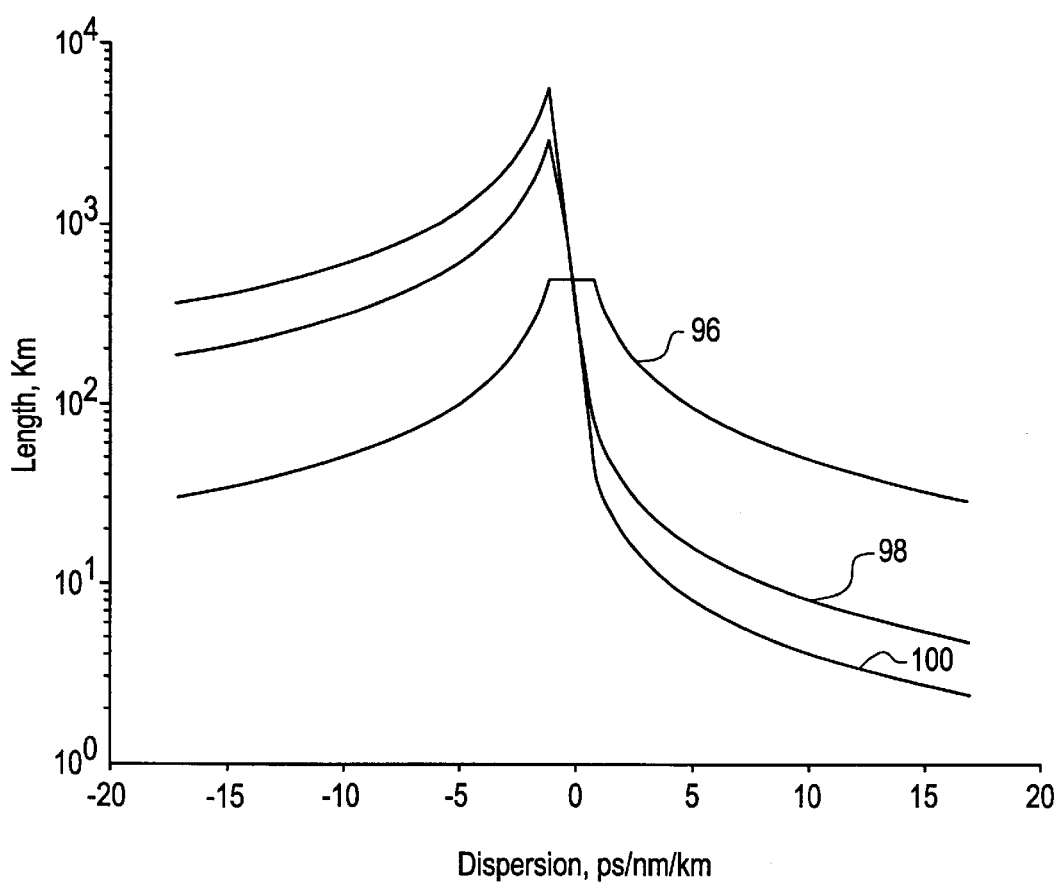

The performance advantage offered by a negative dispersion waveguide in accordance with the invention as claimed in any of claims 1–19 is shown in FIG. 8, which is a chart of link length versus waveguide fiber dispersion at 1550 nm for three different laser operating formats. The link is thus configured to operate in the 1400 nm to 1700 nm wavelength range, preferably 1500 nm to 1700 nm, and more preferably in the wavelength range 1530 nm to 1625 nm. Although reference is made to the link component as an optical waveguide fiber, it is understood that the waveguide fiber in a link is usually cabled or otherwise buffered prior to installation. The source used in the link is a laser having a positive chirp. An example of such a laser is the distributed feedback (DFB) laser which is a preferred source in many communications applications, for example the intra-city or metro system. It is understood that the invention is advantageously usable in any link having a positively chirped laser source. These laser sources include but are not limited to those positively chirped lasers that are externally modulated.

Curve 96 in FIG. 8, is illustrative of a link comprising fiber in accordance with the invention operating at 10 Gb/s in which the laser source is not chirped (linewidth enhancement factor is zero). Curve 96 is symmetric about the zero dispersion point. The modeled achievable link length is essentially the same for a link including positive dispersion waveguide fibers as compared to a link including negative dispersion waveguide fibers.

In contrast, curve 98 is representative of a link comprising fiber having negative dispersion at 1550 nm in accordance with the invention. The system bit rate is again 10 Gb/s and the laser source is positively chirped. The amount of chirp may be measured in terms of the amount of time shift of the wavelengths in the laser pulse. Laser chirp is discussed in detail in *Fiber Optic Communication Systems* (*Chapter* 5), G. P. Agrawal, John Wiley and Sons, 1997. In this case of positive chirp, reading the distance from the vertical axis of FIG. 8, the waveguide fiber having negative total dispersion is seen to allow longer distance between optical to electronic regenerators and the smaller the magnitude of the negative dispersion the greater this distance is. The negative dispersion waveguide causes a blue shift in the laser pulse, opposite in effect to the red shift due to chirp, so that the pulse is compressed after launch into the waveguide. The pulse will not begin to disperse until the blue shift in the fiber has offset all of the red shift due to chirp. To illustrate the system advantage achieved through use of a positively chirped laser together with a negative dispersion transmission, note that for a fiber having −5.0 ps/nm-km curve 98 shows the unregenerated system length to be greater than 600 km. In comparison, an identical system link, except that the laser is not chirped, provides a transmission distance of only 80 km (curve 96). Taking values from curve 98 for a fiber having a total dispersion of −5.0 ps/nm-km at the operating wavelength, the link length before the signal is regenerated is greater than 600 km as compared to about 15 km for a link of 5 ps/nm-km dispersion. Even at total dispersion values as negative as −20 ps/nm-km regenerator spacing is still greater than about 100 km. In calculating these link lengths, waveguide fiber attenuation is taken to be less than 0.25 dB/km and preferably less than 0.22 dB/km. Curve 100 is representative of a link comprising fiber in accordance with the invention and a laser source that is even more positively chirped than the laser used to generate curve 98. As positive laser chirp increases, as shown by curve 100, the performance of the negative total dispersion link improves to a greater extent in comparison to the positive total dispersion link. It is understood that the negative waveguide fiber of the invention may be used at shorter lengths. Practical systems can have lengths in the range 30 km to 50 km range. A practical upper limit at the 10 Gb/s rate is about 1000 km.

Curves similar to those of FIG. 8 are shown in FIG. 9 for a link carrying a bit rate of 2.5 Gb/s. The operating wavelength range and the waveguide fiber attenuation is less than about 0.25 dB/km and preferably less than 0.22 dB/km as in the case for the 10 Gb/s links of FIG. 8. In FIG. 9 the link performance at 1550 nm, for a link in which the laser source is not chirped, as illustrated in curve 102, is seen to be independent of total dispersion sign. For a positive chirp laser source, curve 104 of FIG. 9 again shows the effect of initial pulse compression in the negative total dispersion waveguide link relative to the link comprising positive total dispersion waveguide fiber. As positive chirp increases, the difference in link performance becomes more pronounced as is shown by curve 106. Unregenerated link lengths of at least 1000 km are modeled to be achievable even at total dispersion values of −20 ps/nm-km. At total dispersions of about −5 ps/nm-km unregenerated link lengths of 5000 km are realized. As in the case of the 10 Gb/s link comprising fiber in accordance with the invention, a practical lower limit of link length in the 2.5 Gb/s communications link is 30 km to 50 km. However, the practical upper limit of an unregenerated link at 2.5 Gb/s is about 10,000 km.

The combination of a positively chirped laser source, such as a DFB laser or other externally or directly modulated single mode laser sources, and a link comprising negative dispersion waveguide fiber can provide more than a factor of ten improvement in link length between regenerators over the same link constructed using positive dispersion waveguide fiber.

An example of the configuration of a communications link in accordance with the invention is given in FIG. 10. Positively chirped laser source 108 is optically coupled to negative total dispersion waveguide 110. Additional negative dispersion waveguides 110 are optically coupled in series arrangement to span the distance between laser source 108 and receiver 114. Optical amplifiers 112 are optically coupled in series arrangement into the optical waveguide communications link as indicated by the link power budget which is determined by such factors as input laser power and desired bit error rate limit.

An aspect of the invention in which the negative dispersion waveguide fiber is used as a dispersion compensating fiber is shown in FIG. 10b. A multi-wavelength transmitter 116 typically may include a plurality of laser sources each optically coupled into a waveguide fiber link. The link includes positive dispersion lengths 118 optically coupled one to another in series arrangement. The link also includes negative dispersion waveguide fibers 110 in accordance with the invention. Receiver 120 is configured to receive the multiple signals at the transmitted wavelengths. The link may include optical amplifiers 112. This aspect of the invention is distinguished over other dispersion compensation schemes by the unique profiles and properties of the negative dispersion waveguide fiber.

In this embodiment, the lengths of positive and negative total dispersion waveguide fiber may be chosen to provide a pre-selected end to end link dispersion. For example, the sum of the positive and negative dispersions of the individual waveguide fibers making up the link may be selected to be sufficiently low to limit dispersion penalty. At the same time, the total dispersion at each point along the link is not near zero, thereby limiting dispersion due to four wave mixing.

A typical multiplexed link has a pre-selected total end to end dispersion which is governed in part by the width of the wavelength range used in conjunction with the total dispersion slopes of the waveguide fibers of the link. Because of the low total dispersion slope of waveguides in accordance with the invention a wavelength range of 1250 nm to 1700 nm is deemed possible. End to end dispersion over this wavelength range can be no greater than 300 ps/nm. A preferred range of end to end link dispersion is no greater than 200 ps/nm, and a more preferred end to end link dispersion is no greater than 100 ps/nm over the wavelength range. It is understood that much lower end to end link dispersion is possible by shortening link length or narrowing the wavelength range over which signals are multiplexed.

The negative waveguide fiber of the invention is designed to be sufficiently bend resistant to allow for cabling or other buffering steps before installation. Thus, the negative dispersion waveguide of the present invention exhibits a. pin array bend loss less than 20 dB, more preferably less than 15 dB, and most preferably less than 12 dB. Attenuation induced by the lateral load bending test is less than about 0.63 dB. A lateral induced bend less than 0.80 is acceptable.

The negative dispersion fiber of the present invention can also be used in conjunction with other fiber, such as, fiber having a positive dispersion. In one such embodiment, a waveguide fiber having positive total dispersion and a relatively large effective area (effective area greater than about 60 $\mu m^2$, preferably greater than 70 $\mu m^2$, and more preferably greater than 80 $\mu m^2$) is installed nearest the transmitter. In this configuration, non-linear dispersion effects due to relatively high launched power will be limited by the positive total dispersion waveguide having the larger effective area. The signal will be attenuated before reaching the relatively smaller effective area negative total dispersion waveguide fiber, so that signal amplitude dependent non-linear effects will be lessened.

Figure 11:
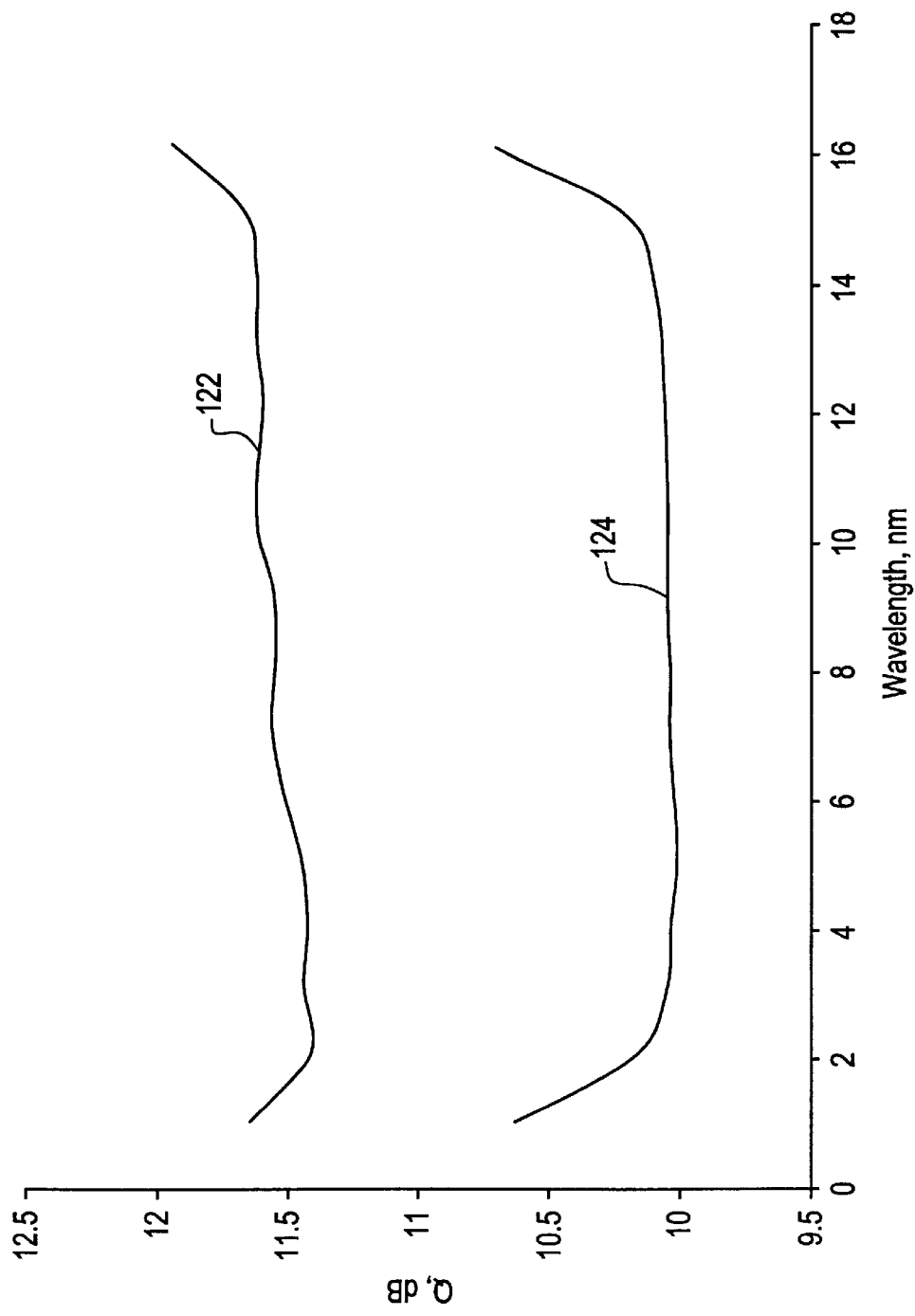
FIG. 11 illustrates link Q value versus channel number for two multiplexed system links at 100 GHz channel spacing and 3 dBm power.
Figure 12:
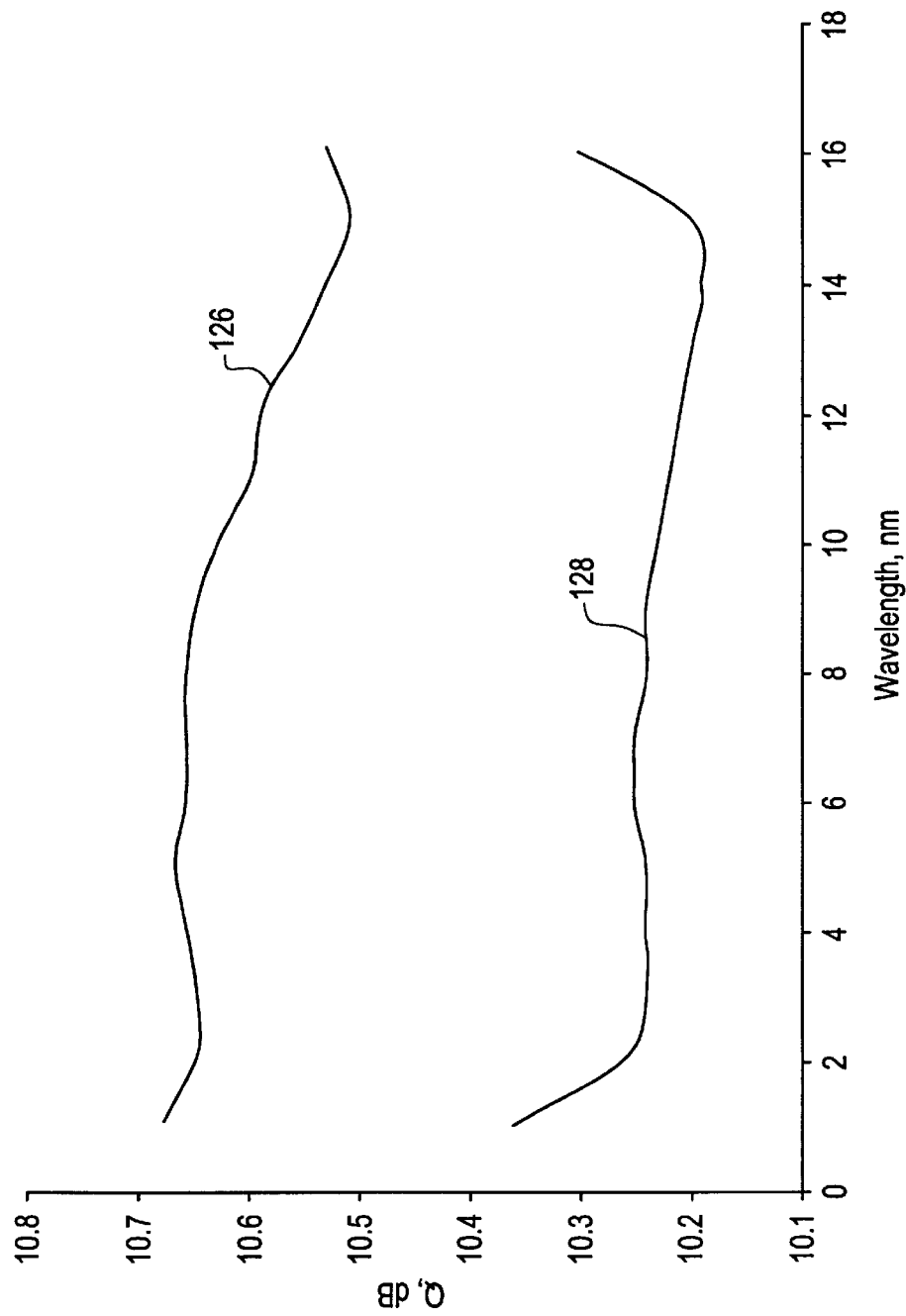
FIG. 12 illustrates link Q value versus channel number for two multiplexed system links at 100 GHz channel spacing and 0 dBm power.
Figure 13:
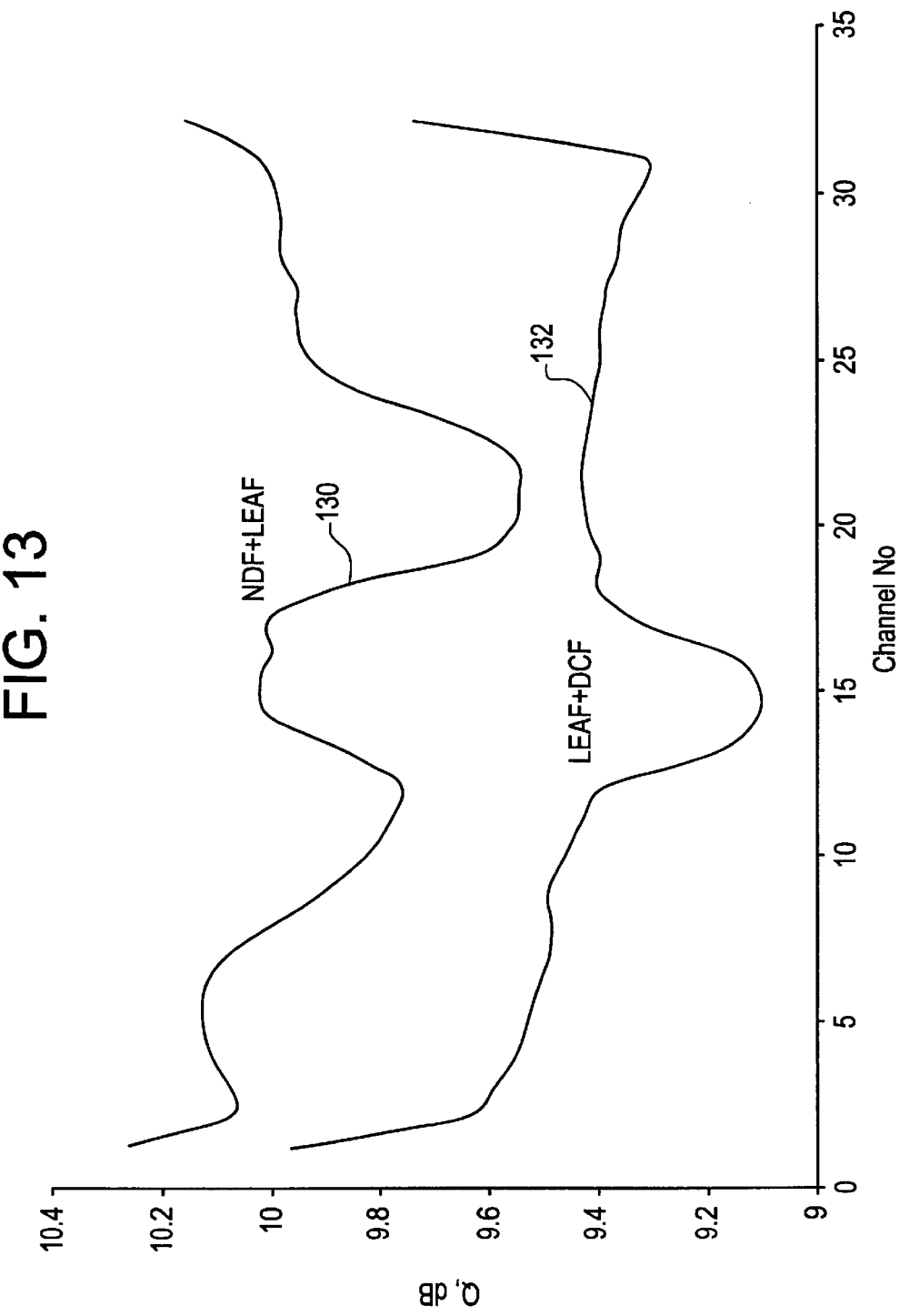
FIG. 13 illustrates link Q value versus channel number for two multiplexed system links at 50 GHz channel spacing.

Performance of links in accordance with this aspect of the invention is shown in FIGS. 11–13. The Q of the link is ratio of the difference in receiver current when receiving a digital 1, $i_i$, to the receiver current when receiving a digital 0, $i_o$, to the sum of the respective standard deviations of the two receiver noise currents, $\sigma_1$ and $\sigma_o$. That is $Q=(i_1-i_o)/(\sigma_1+\sigma_o)$. In the figures, Q is expressed in dB so that the equation is written Q (dB)=10 $\log_{10}$ Q. A higher Q value represents a link having a superior bit error rate. A Q below less than about 8.5 dB is not acceptable in a typical telecommunications link.

Turning now to FIG. 11, the Q versus channel wavelength of a link is charted for the case in which bit rate is 10 Gb/s, optical amplifier spacing is about 80 km, channel spacing is 100 GHz for 16 channels operating in the wavelength range 1547.72 nm to 1559.79 nm, and source power is 3 dBm. The Q of a link having six 80 km spans, three spans (240 km) being Corning's LEAF® positive dispersion waveguide fiber and three spans (240 km) being negative dispersion fiber of the present invention is shown as curve 122. The Q is near 11.5 dB over the operating wavelength range, thus providing an exceptionally low bit error rate. This is compared to a Q of about 10 dB for a link using a conventional dispersion compensating module known in the art. FIG. 12 shows the Q curves for the same link configuration as in FIG. 11, except that the launched power is 0 dBm. Here again the performance, a Q not less than 10.5 dB, of the negative dispersion waveguide in accordance with the invention is superior to that of a conventional compensating module. A dispersion compensating module typically exhibits a total dispersion of −80 ps/nm-km and an attenuation of 0.5 dB/ km or greater. In the example case immediately above, 24 km of compensating fiber would be required in the dispersion compensating module. The additional attenuation introduced by the module results in the need for an additional optical amplifier.

In addition to reducing the number of optical amplifiers required, an advantage of the waveguide fiber in accordance with the invention is that manufacturing cost is typically lower than that of the waveguide fiber used in a conventional dispersion compensating module. The negative dispersion waveguide of the invention is an integral part of the link in that it spans distance rather than being added at the end of a link as a module. The link in accordance with the invention distinguishes over prior art dispersion compensating schemes in which negative dispersion waveguide fiber is used in that the waveguide fiber of the invention compensates dispersion over an extended wavelength band. In particular a waveguide fiber made in accordance with the invention, compensates dispersion over both the C-Band (1530 nm to 1565 nm) and the L-Band (1565 nm to 1625 nm) simultaneously. It will be understood that the waveguide fiber in accordance with the invention must have a zero dispersion wavelength greater than the highest wavelength of the L-band to be used.

Curve 126 for the negative dispersion fiber compensation lies in the range 10.7 dB to 10.5 dB. The Q of the link when a conventional dispersion compensating module is used is lower and lies in the range 10.4 dB to 10.2 dB. FIGS. 11 and 12 taken together show that optimum link performance is achieved for a launched power of 3 dBm as opposed to 0 dBm launched power.

The performance of another embodiment of this aspect of the invention is shown in FIG. 13. The configuration here is a 480 km link including 32 channels operating at a bit rate of 10 Gb/s, at a channel spacing of 50 GHz, and a launched power of 0 dBm. The operating wavelength range is the same as that of the link discussed in conjunction with FIG. 11. In curve 130 of FIG. 13, 240 km of Corning's LEAF® optical fiber was employed along with 240 km of the negative dispersion fiber of the invention. The Q range is about 10.2 dB to 9.6 dB, i.e., not less than 9.5 dB, for curve 130. This is a marked improvement over the Q curve 132 which is representative of a link using Corning's LEAF® waveguide fiber and a conventional dispersion compensating module as described above. In modeling the curves of FIGS. 11–13, the positive dispersion waveguide fiber is characterized by a 4 ps/nm-km and an effective area of 70 $\mu m^2$. The measurement of Q can be made using transmitters and receivers known in the art. Example receivers suitable for use in the telecommunications links disclosed and described herein are Alcatel 1916 SDH, Receiver STM16/OC48 for D-WDM, Alcatel, 12030 Sunrise Valley Drive, Reston, Va., 22091, and, 1320-Type Lightwave Receiver, Lucent Technologies, 555 Union Boulevard, Room 30L-15P-BA, Allentown, Pa., 18103. Example transmitters suitable for use in the telecommunications links disclosed and described herein are D2570, D2526, D2555 Wavelength-Selected Laser 2000, Lucent Technologies (see address above), and LC155W-20A, WDM DFB Laser Module, Optoelectronics, Brixham Road, Paignton, Devon, TQ4 7BE.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. An optical waveguide fiber comprising:
   a core region having a centerline and at least two segments, each said segment having a relative refractive index, a refractive index profile, and an inner and an outer radius, the radii being measured with reference to the centerline;
   a clad layer surrounding and in contact with the core region, said clad layer having a relative index and a refractive index profile; wherein,
   said core and clad refractive index profiles are configured to guide light having a wavelength within a wavelength range; and wherein,
   the respective relative indexes of said at least two segments are positive wherein the reference refractive index, of the relative indexes, is the average refractive index of the clad layer, and,
   the respective relative indexes, refractive index profiles and inner and outer radii of said at least two segments are chosen to provide a waveguide fiber having negative total dispersion at 1530 nm and a positive dispersion slope over the range 1530 nm to 1565 nm, and a zero dispersion wavelength greater than 1595 nm.

2. The optical waveguide of claim 1 wherein said zero dispersion wavelength is greater than or equal to 1610 nm.

3. The optical waveguide of claim 1 wherein the total dispersion at 1600 nm is more negative than −0.1 ps/nm-km and total dispersion at 1530 nm is less negative than −15 ps/nm-km.

4. The optical waveguide of claim 1 wherein the core region includes two segments, the first segment beginning at the centerline and having a relative index in the range of 0.75% to 0.85%, and the second segment having a relative index in the range 0.01% to 0.05%.

5. The optical waveguide of claim 4 wherein the first segment has an outer radius in the range of 2 μm to 3 μm, and the second segment has an outer radius in the range 9 μm to 10 μm.

6. The optical waveguide of claim 1 wherein the core region includes three segments,
   the first segment beginning at the centerline and having a relative index in the range 0.65% to 1.2% and an outer radius in the range of 2 μm to 3.5 μm,
   a second segment having a relative index in the range 0 to 0.08%, and an outer radius in the range 5 μm to 9 μm, and,
   a third segment having a relative index in the range 0.1% to 0.30% and an outer radius in the range 5.5 μm to 11 μm.

7. The optical waveguide of claim 6 wherein the index profile shape of the third segment is an α-profile having a in the range of 0.7 to 2.5 and a relative index percent in the range 0.15% to 0.22%.

8. The optical waveguide of claim 6 wherein the index profile shape of the first segment is an α-profile having an α in the range 2.0 to 2.5 and a relative index percent in the range of 0.70% to 0.85%.

9. The optical waveguide of claim 6 wherein the relative index percent of the first segment is in the range 0.80% to 0.85%.

10. The optical waveguide of claim 6 wherein the index profile shape of the third segment is a rounded step having a relative index percent in the range 0.15% to 0.22%.

11. The optical waveguide of claim 6 wherein,
    the index profile shape of the first segment is an α-profile having an α in the range 2.0 to 2.5 and a relative index in the range 0.72% to 0.78%, and outer radius 42 in the range of 2 μm to 3.5 μm, and,
    the profile shape of the third segment is a rounded step index having a relative index percent in the range 0.15% to 0.19%, said third segment having inner radius in the range 5.6 μm to 6.2 μm and an outer radius in the range of 9 μm to 10 μm and wherein the first segment has a centerline relative index in the range 0.70% to 0.76%.

12. The optical waveguide of claim 6 wherein
    the index profile shape of the first segment is an α-profile having an α in the range of 0.9 to 1.1, said first segment having a relative index percent in the range 1 to 1.2 and an outer radius in the range 2.8 μm to 3.2 μm,
    the profile shape of the second segment is a step having a relative index percent of 0 and an outer radius in the range 8.5 μm to 8.9 μm, and,
    the profile shape of the third segment is a rounded step having a relative index in the range 0.15% to 0.20% and an outer radius in the range of 9.3 μm to 9.7 μm.

13. The optical waveguide of claim 6 wherein the core region includes three segments,
    the first segment beginning at the centerline and having an α-profile wherein α is in the range 0.70 to 1.5, a relative index in the range 0.40% to 0.90%, and an outer radius in the range of 2.5 μm to 3.0 μm,
    a second segment having a relative index in the range 0 to 0.04%, and
    a third segment having a relative index in the range 0.17% to 0.30%, a center radius in the range 5.5 μm to 8.5μm, and a width in the range 1 μm to 2.5 μm.

14. The optical waveguide of claim 2 wherein the core region includes three segments,
    the first segment beginning at the centerline and having a central portion of a first profile shape and a second portion of a second profile shape, said first profile shape being a step profile having a relative index percent in the range 0.60% to 0.65% and an outer radius in the range 0.95 μm to 1.40 μm, and said second portion profile shape being a rounded step having a relative index percent in the range 0.76% to 0.80% and an outer radius in the range 2 μm to 2.5 μm,
    the second segment having a relative index percent of 0 and an outer radius in the range 8 μm to 8.4 μm, and,
    the third segment having a profile shape of a rounded step, a relative index percent in the range 0.05% to 0.10%, and an outer radius in the range 9.6 μm to 10 μm.

15. The optical waveguide of claim 2 wherein the core region includes three segments,
    the first segment beginning at the centerline and having a central portion of a first profile shape and a second portion of a second profile shape, said first profile shape being a step profile having a relative index percent in the range 0.65% to 0.70% and an outer radius in the range 0.95 μm to 1.40 μm, and said second profile shape being a rounded step having a relative index percent in the range 0.73% to 0.78% and an outer radius in the range 2 μm to 2.5 μm,
    the second segment having a relative index percent of 0.01% to 0.03% and an outer radius in the range 4.5 μm to 5.5 μm, and,
    the third segment having a profile shape of a rounded step, a relative index percent in the range 0.04% to 0.08%, and an outer radius in the range 9.6 μm to 10 μm.

16. A waveguide fiber communications link, having no regenerators and having a bit rate and a length, comprising:

a laser source to provide light signals that have a pre-selected wavelength;

a receiver to receive light at the pre-selected wavelength; and, at least one length of waveguide fiber having a first and a second end, said first end optically coupled to said laser source to receive the laser light, and said second end optically coupled to said receiver; wherein, said laser source is chirped, the chirp being either positive or negative, and, the total dispersion of said at least one length of waveguide fiber at 1550 nm has total dispersion opposite in sign to the laser chirp.

17. The communications link of claim 16 wherein the laser is positively chirped and the total dispersion of a portion of said at least one length of waveguide fiber is negative.

18. The communications link of claim 17 wherein the portion of said at least one length of waveguide fiber that has negative total dispersion has a refractive index profile of at least two segments and the respective relative indexes of said at least two segments are positive, wherein the reference refractive index is the average refractive index of the clad layer, and, the respective refractive index profiles and inner and outer radii of said at least two segments are chosen to provide a waveguide fiber having negative total dispersion at 1530 nm and a positive dispersion slope over the range 1530 nm to 1565 nm, and a zero dispersion wavelength greater than 1595 nm.

19. The communications link of claim 18 wherein the attenuation of the waveguide fiber is less than or equal to 0.25 dB/km at 1550 nm.

20. The communications link of claim 18 wherein the attenuation of the waveguide fiber is less than or equal to 0.22 dB/km at 1550 nm.

21. The communications link of claim 18 further comprising one or more optical amplifiers optically coupled into the link in series arrangement between a respective one or more pairs of said waveguide fiber.

22. The communications link of any one of claims 16 through 21 wherein the bit rate is 2.5 giga-bits/second and the length of said at least one waveguide fiber is in the range 30 km to 10000 km.

23. The communications link of any one of claims 16 through 21 wherein the bit rate is 10 giga-bits/second and the link length is in the range 30 km to 1000 km.

24. The communications link of claim 16 wherein at least a portion of the at least one waveguide fiber length has a positive dispersion.

25. The communications link of claim 16 wherein the at least one waveguide fiber length has a total end to end dispersion magnitude not greater than 10 ps/nm.

26. The communications link of claim 25 wherein said total end to end dispersion magnitude is not greater than 5 ps/nm.

27. A waveguide fiber communications link, having no regenerators and a bit rate, comprising:

a transmitter to provide light signals at one or more pre-selected wavelengths selected from a range 1250 nm to 1700 nm;

a receiver to receive the light at the one or more pre-selected wavelengths; and, a plurality of lengths of waveguide fiber optically coupled in series arrangement one to another to form a link having a first and a second end, said first end optically coupled to said transmitter, and said second end optically coupled to said receiver; wherein, the light signals of said transmitter are positively chirped;

each of said plurality of lengths of waveguide fiber has an end to end dispersion and a portion of said plurality of lengths has a positive end to end dispersion and the remaining portion of the plurality of lengths of waveguide fiber has a negative end to end dispersion;

said link has an end to end dispersion which is the sum of the respective end to end dispersions of the plurality of lengths of waveguide fiber, and said end to end dispersion of the link has a magnitude that is less than a pre-selected value; and wherein, the portion of the plurality of lengths of waveguide fiber that has a negative end to end dispersion.

28. The communications link of claim 27 wherein said magnitude of end to end link dispersion over said wavelength range is less than 300 ps/nm.

29. The communications link of claim 28 wherein said magnitude of end to end link dispersion over said wavelength range is less than 200 ps/nm.

30. The communications link of claim 28 wherein the pin array bend loss of the negative dispersion waveguide fiber is less than 15 dB.

31. The communications link of claim 28 wherein the positive dispersion fiber comprises the portion of the link nearest the transmitter.

32. The communications link of claim 31 wherein the positive dispersion fiber has an effective area not less than 60 $\mu m^2$.

33. The communications link of either one of claims 28 or 29 further comprising one or more optical amplifiers optically coupled into the link in series arrangement between a respective one or more pairs of the plurality of waveguide fiber lengths, said optical amplifiers being spaced apart by a pre-selected distance, and said link propagates 16 wavelength division multiplexed signals at a bit rate of 10 Gb/s, said signals having a spacing of 100 GHz, wherein the distance between optical amplifiers is not less than 80 km and, said transmitter, said receiver, and said optical waveguide fiber are such that the Q of the link is not less than 8.5 dB.

34. The communications link of claim 33 wherein the Q of the link is not less than 9.0 dB.

35. The communications link of either one of claims 28 or 29 further comprising one or more optical amplifiers optically coupled into the link in series arrangement between a respective one or more pairs of the plurality of waveguide fiber lengths, said optical amplifiers being spaced apart by a pre-selected distance, and said link propagates 32 wavelength division multiplexed signals at a bit rate of 10 Gb/s, said signals having a spacing of 50 GHz, wherein the distance between optical amplifiers is not less than 80 km and said transmitter, said receiver, and said optical waveguide fiber are such that the Q of the link is not less than 8.5 dB.

36. The communications link of claim 35 wherein the Q of the link is not less than 9.0 dB.

37. The telecommunications link of claim 27 wherein said transmitter includes a directly modulated laser light source.

38. The telecommunications link of claim 16 wherein said laser is predominantly transiently chirped.

39. The telecommunications link of claim 38 wherein the gain compression factor is no greater than about $1\times10^{-23}$ $m^3$.

* * * * *

UNITED STATES PATENT AND TRADEMARK OFFICE
CERTIFICATE OF CORRECTION

PATENT NO.    : 6,430,346 B1
DATED         : August 6, 2002
INVENTOR(S)   : Conradi et al.

It is certified that error appears in the above-identified patent and that said Letters Patent is hereby corrected as shown below:

Column 15,
Line 52, after the word "having", "a" should be corrected to -- α --.

Signed and Sealed this

Eighth Day of July, 2003

JAMES E. ROGAN
*Director of the United States Patent and Trademark Office*